(12) United States Patent
Xia et al.

(10) Patent No.: US 8,423,633 B2
(45) Date of Patent: Apr. 16, 2013

(54) ASSISTED DETERMINATION OF DATA FLOWS IN COMMUNICATION/DATA NETWORKS

(75) Inventors: Quanshi Xia, London (GB); Helmut Matthias Simonis, Richmond (GB)

(73) Assignee: Cisco Technology, Inc., San Jose, CA (US)

( * ) Notice: Subject to any disclaimer, the term of this patent is extended or adjusted under 35 U.S.C. 154(b) by 1799 days.

(21) Appl. No.: 10/547,741

(22) PCT Filed: Mar. 19, 2004

(86) PCT No.: PCT/GB2004/001202
§ 371 (c)(1),
(2), (4) Date: Sep. 1, 2005

(87) PCT Pub. No.: WO2004/084490
PCT Pub. Date: Sep. 30, 2004

(65) Prior Publication Data
US 2006/0168168 A1 Jul. 27, 2006

(30) Foreign Application Priority Data
Mar. 20, 2003 (GB) .................................. 0306439.1

(51) Int. Cl.
*G06F 15/177* (2006.01)
*G06F 15/173* (2006.01)

(52) U.S. Cl.
USPC .......................................... 709/224; 709/220

(58) Field of Classification Search .......... 709/220–226
See application file for complete search history.

(56) References Cited

U.S. PATENT DOCUMENTS

| | | | |
|---|---|---|---|
| 5,426,674 A | 6/1995 | Nemirovsky et al. | |
| 5,450,408 A * | 9/1995 | Phaal | 370/256 |
| 5,526,283 A | 6/1996 | Hershey et al. | |
| 5,598,532 A * | 1/1997 | Liron | 703/2 |
| 6,278,694 B1 | 8/2001 | Wolf et al. | |
| 6,701,324 B1 * | 3/2004 | Cochran et al. | 1/1 |
| 6,792,434 B2 * | 9/2004 | Moghaddam et al. | 1/1 |
| 7,080,136 B2 * | 7/2006 | Duffield et al. | 709/223 |
| 7,295,960 B2 * | 11/2007 | Rappaport et al. | 703/13 |
| 7,376,574 B2 * | 5/2008 | Toan et al. | 705/4 |
| 7,478,071 B2 * | 1/2009 | Kadambe | 705/500 |
| 7,535,849 B2 * | 5/2009 | Laiho et al. | 370/241.1 |
| 2002/0103916 A1 * | 8/2002 | Chen et al. | 709/229 |
| 2002/0143926 A1 * | 10/2002 | Maltz et al. | 709/224 |
| 2002/0143929 A1 * | 10/2002 | Maltz et al. | 709/224 |
| 2002/0188710 A1 * | 12/2002 | Duffield et al. | 709/223 |
| 2003/0097438 A1 * | 5/2003 | Bearden et al. | 709/224 |
| 2004/0143428 A1 * | 7/2004 | Rappaport et al. | 703/22 |
| 2004/0236547 A1 * | 11/2004 | Rappaport et al. | 703/2 |

FOREIGN PATENT DOCUMENTS

WO WO 98/32149 7/1998

OTHER PUBLICATIONS

Mills et al. "Internet Accounting: Background," Internet Society, 1991.*
Awduche, et al. "Overview and Principles of Internet Traffic Engineering," Internet Society, 2002.*
Ritter D. et al.: "A Multipurpose Distributed LAN Traffic Monitoring Tool", Jul. 1987, IEEE Network, IEEE Inc. New York, US, pp. 32-39, XP000811692, ISSN: 0890-8044.

* cited by examiner

*Primary Examiner* — Patrice Winder
*Assistant Examiner* — Julian Chang
(74) *Attorney, Agent, or Firm* — Cindy Kaplan

(57) ABSTRACT

In one embodiment, a method of determining data traffic flow in a network includes: (a) selecting a location within the network for providing a data collector adapted to process data pertaining to the network data traffic flow; (b) determining the expense or level of data capture that would result from providing the data collector at the selected location; and (c) providing the data collector at the selected location dependent on the determination in step (b) and predetermined expense or data capture targets.

38 Claims, No Drawings

ASSISTED DETERMINATION OF DATA FLOWS IN COMMUNICATION/DATA NETWORKS

This application claims benefit of co-pending PCT application PCT/GB2004/001202 filed Mar. 19, 2004, which was published on Sep. 30, 2004, which claims the benefit of GB application No. 0306439.1 filed Mar. 20, 2003.

The present invention relates to a data network and a method of determining data flow in a data network.

BACKGROUND OF THE INVENTION

Obtaining the traffic matrix of a data network is often considered as the first step in a variety of operational management or planning tasks. The traffic matrix describes who is using the network by sending how much traffic between different points in the network. If the traffic matrix is understood accurately, it is possible, for example, to predict the impact of topology changes or study the behaviour of the network under the failure of components. The traffic matrix is also required when introducing traffic engineering (TE), explicitly controlling how traffic is moved through the network.

Considering its importance it may come as a surprise that there appear to be few known ways of extracting a traffic matrix from the actual network:

External Interface Capture

One method to obtain the complete traffic matrix is to collect data at all ingress/egress points. This provides all relevant information, without affecting core network performance. Clearly, the resource consumption of the edge devices will increase, and it may be prohibitively expensive to install data collectors for all edge interfaces. Transfer of the collected information to a central analysis point also is an issue. This method needs strong data aggregation in each access location in order not to swamp the network with Netflow-generated traffic. The number of concentrator devices required may be very large.

Zero Bandwidth Tunnels

In an MPLS (multi protocol label switching) enabled network, zero-bandwidth TE (traffic engineering) tunnels can be generated to measure traffic between different routers. By generating a full mesh of tunnels between all pairs of routers, a traffic matrix can be obtained simply by reading the MIB (management information base) traffic counters for the tunnels. A significant difficulty arises when implementing a full mesh of TE tunnels in networks where an SPF (shortest path first) routing scheme is already used. Capacity problems may occur when multiple equal-cost optimal routes exist in the SPF network, and the introduction of the TE tunnels would lead to a different traffic distribution.

Traffic Flow Analysis (TFA)

It is possible to infer traffic flows from interface counters by setting up a model linking the traffic volume through an interface to all flows that are routed through the interface. Unfortunately, this model is under-constrained, so that normally billions of wildly differing possible solutions exist. It is easy to find a solution that is consistent with the observed data, but there is no guarantee that the actual traffic matrix is the same or even related to the one obtained by the model.

This model describing the traffic matrix may be a good starting point for further extensions (called traffic inference (TI)), but on its own is not strong enough to provide reliable results.

LSP Counters

For MPLS-enabled networks, it is possible to collect LSP (label switched path) counter MIBs which provide information about certain aggregated flows in the network. The traffic matrix can be (partially) reconstructed from this information. Data collection across the network may create problems when the number of LSPs is large.

Deduction from SLA

If the SLAs (service level agreements) of the customers are detailed enough, it is possible to deduce an upper bound of the traffic matrix. This not only requires information about the ingress/egress bandwidth for each interface, but also requires information (or assumptions) about the destination of traffic injected from each customer interface. Often, this type of information is not directly available in the SLA. Another problem is that the SLA typically describes peak rates; applying them simultaneously across the network for all customers would lead to a massive overloading of the existing capacity.

Estimation

The traditional method of obtaining a traffic matrix is based on estimation by an experienced network manager. Depending on the knowledge available, this may provide a good picture of the actual traffic. However, without a way of checking against actual measured values, this approach seems limited to rough capacity planning, and many operational issues cannot be addressed.

It is thus desirable to provide an improved way of observing data traffic flow in a network with a view to determining the traffic matrix. The present invention aims to address this problem.

SUMMARY OF THE INVENTION

According to one aspect of the invention, there is provided a method of determining traffic flow in a network, the method comprising:

(a) selecting a location within the network for providing a data processing means adapted to process data pertaining to the network data flow;

(b) determining the expense and/or level of data capture that would result from providing the data processing means at the selected location; and (c) providing the data processing means at the selected location dependent on the determination in step (b) and predetermined expense and/or data capture targets.

According to another aspect of the invention, there is provided a method of observing data traffic in a network, the method comprising:

(a) determining a desired data collection result in relation to an acceptable data collection expense; and (b) selecting a number of locations within the network for placing data processing means to obtain said desired data collection result at said acceptable data collection expense.

According to another aspect of the invention, there is provided a data network comprising one or more inputs, outputs and routers, and a plurality of data processing means for processing data pertaining to the traffic flow in the network, wherein each of the data processing means is associated with a data capture value and/or an expense value, dependent on its location within the network, and wherein the number and/or locations of the data processing means are selected in accordance with predetermined expense and/or data capture targets.

Accordingly, the invention can be used to select points inside the core of a network for data capture of flows routed through them in order to construct the traffic matrix of the network.

This approach has a number of advantages over known methods of obtaining the traffic matrix of a data network. In particular, it can be used for different use cases, maximizing the capture level for a given investment or finding the minimal investment to achieve a given capture level:

First Use Case: which Capture Level for a Given Investment?

Usually, the number of data collectors that can be deployed is limited by the administration overhead imposed on the network managers, the effect on router performance by enabling collection for some interfaces, or the investment required for data collectors and deployment. The first use case therefore addresses the best use of a given investment limit. The objective is to maximize the information obtained from the ensemble of the collectors. This solution may be quite different from finding the best location for individual collectors.

An extended version of this use case comprises building a graph to indicate the coverage of the traffic matrix for different investment levels. Such a graph can be used in a cost/benefit analysis to choose the most appropriate number of data collectors for a given network.

Second Use Case: how Much to Invest for a Given Capture Level

The second use case addresses the question of how many data collection points are required to determine a given percentage of the traffic matrix, either in percentage of the total flow volume or as a fraction of the number of flows in the network. The result also presents a placement of the collectors and concentrators in the network. This use case allows estimation of the investment required to achieve a certain level of accuracy for the flow capture.

Third Use Case: how to Re-Arrange Captures when Collectors are Already Deployed

The third use case addresses the situation where data collectors are already deployed in the field. After a change of the topology, the routing or the traffic patterns, it is desirable to reconsider the placement of the data collectors. Moving a data collector incurs a certain redeployment cost, but, on the other hand, may help to increase the amount of information extracted. The present approach searches for a good compromise between further expense and the accuracy of the traffic matrix obtained. An extension of this use case also comprises buying new collectors, as well as moving existing ones. Again the objective is to find the best compromise between investment and accuracy of the results.

DETAILED DESCRIPTION OF AN EMBODIMENT

1 Non-Mathematical Description

In the following, an embodiment of the invention is explained in non-mathematical terms.

1.1 Network

The aim is to understand the traffic matrix in a computer network, i.e. to understand who is talking to whom and how traffic flows between different end points contribute to the overall utilization of the network.

1.1.1 Router

The main devices considered in the network are routers which forward traffic from external connections through the core of the network to other external connections. In particular, IP (Internet protocol) computer networks are considered, where traffic consists of packets that are transported individually through the network.

A router that is connected to external links is called a PE (provider edge) router, a router that is only connected to other routers of the same network is called P (provider core) router.

1.1.2 Interface

The connection of a router to a network link is called an interface. An interface typically sends and receives traffic over the same link, so that the two interfaces at both ends of a link see the same traffic.

1.1.3 Collectors

A data collector can be a hardware or software component, either forming part of a router or being a separate device. Collectors are identified by the interface for which they provide traffic information, but actual collectors may well collect multiple interfaces at the same time. Data collectors provide information about the traffic flows through the network, i.e. they provide partial information about the traffic matrix.

Two examples of data collectors are Netflow® and IP network probes. The first is a software feature of a router, which provides (if enabled) information about all packets that are forwarded over the interface. Depending on the version of the software and the associated protocol, key values (source, destination, ports, protocol) can be collected in the router's memory and are then forwarded to a data concentrator. Enabling Netflow on an interface may incur some performance penalty on the router performance, as it has to provide CPU power and memory for the data collection. Not all routers support Netflow, and other routers may support Netflow only on certain interface types.

Another type of data collector is an IP network probe, which is a device independent from a router. It attaches to a network link and collects information about the packets traversing the link. Such probes come in different variants and sizes, some are specialized for certain link technologies and have limits on which link speeds they can monitor. Network probes typically do not affect the performance of the network, but may require significant extra investment.

1.1.4 Flows and Routing

The granularity of the flows collected for the traffic matrix can be varied. In a simple approach, the flows between routers (or even just between groups of routers) are observed. This assumes that all traffic between two routers in the network is moving over the same route, which is controlled by the routing algorithm of the network. This granularity of flow model can be used for capacity planning or resilience analysis.

A more detailed traffic matrix would reflect all flows between the different customers of the network; these are referred to as CE-CE (customer-edge to customer edge) flows. This information is useful when considering billing or a marketing analysis of the network use. Normally, there are many more CE-CE flows than flows between routers, so that the storage requirements are significantly higher. The flow capture model of this embodiment handles both cases if the data collectors can provide information in the required granularity.

The model assumes that the routing in the network is sufficiently understood to tell which flows are captured if data collection is enabled for an interface. If there is more than one shortest path between two nodes in the network, this is dealt with as two independent flows that need to be captured individually. In this embodiment, a specific routing module is used that from the configuration files of the network calculates which flows are captured by which interfaces, by simulating the routing algorithm that is used. However, this routing information may also come from other sources, for example direct observation of the network.

1.2 Concentrators

In some situations the data collectors may be able to abstract the raw network data in such a way that the information can be directly read from a central system which interprets the results. However, the data collectors often provide a large amount of unprocessed data that needs to be concentrated before it is passed on to a central system.

This role is taken by concentrators, often workstations or PCs, which get the raw data from the data collectors and aggregate the relevant pieces of information. By co-locating these concentrators with the router, a local area network can be used for the high volume data traffic while using the network itself for transporting the much smaller concentrated traffic to a central analysis tool. By scaling the concentrator properly, it can handle the data volumes even of large capacity collectors, or may be able to control data collection from multiple interfaces at the same time. There obviously is a trade-off between the number of concentrators and their specification and resulting cost.

1.3 Locations

In the model of this embodiment, concentrators can be placed in different locations. Often, routers from a single point of presence (PoP) are co-located in the same building. In this case, this is the place where the concentrators for these routers are located.

If sufficient network capacity is available, a concentrator can be placed away from a router and a network used to handle the large-volume data transport. As link traffic data can be collected from both ends of a connection, there is an additional degree of freedom on where to place the concentrators.

1.4 Concentrator Traffic

Depending on the locations of the data collectors and the concentrators, significant network traffic can be created by the transportation of the raw, uncompressed measurements. This can be a significant cost factor. In comparison, the traffic between the concentrators and the central analysis platform can be neglected.

1.5 Router Capacity

If a Netflow type data collector is considered which uses router infrastructure for part of the data collection, then some penalty on the router performance results as soon as data collection is enabled. In order to minimize its impact, constraints on the router can be imposed to limit the consumption of resources. For example, the total number of collected interfaces, or the total flow rate that is travelling through collected interfaces can be limited. These limits will vary on different router types and on performance aims imposed on the network.

To express these restrictions, the concept of capacity types is introduced. For each capacity type, the capacity needed for a collected interface can be defined, and a limit imposed on the total consumption for all collected interfaces of a router.

1.6 Concentrator Capacity

In a similar way to the router capacity the concentrator capacity can be introduced. For different concentrator types limits are imposed on the total capacity of all data collectors which are assigned to a concentrator. This type of constraint can also be used to express compatibility of certain concentrator types with different data collectors.

1.7 Impact on Network

The capacity limits above are local limits which affect all collected interfaces of a router or those assigned to a concentrator. In addition, network-wide limits can be expressed, stating for example that only data at two high-speed interfaces in the whole network is to be collected. Such limits are advantageous in particular if all interfaces of the same technology type are considered.

1.8 Cost Model

A cost model is proposed that has three components. The first is the cost of the collected interfaces. For each interface, a cost is defined if it is collected. The collector cost is the sum of all these values. This may be either capital expenditure (in the case of network probes) or administration cost (since network managers may have to configure and maintain the data collection).

The second cost component is the cost of concentrators. Depending on their type and their number, but also on their location, there may be a wide choice of different solutions for concentrator selection at a location.

The third component is the cost of the traffic between the data collectors and their assigned concentrators. By co-locating concentrators and collectors, this cost may be reduced to zero. On the other hand, some under-utilized network and concentrator capacity can be used in assigning some data collectors to concentrators which are located at a different place.

1.9 Use Cases

In this embodiment the three use cases mentioned above are handled by stating different additional constraints and objective functions.

1.9.1 Use Case 1

In the first use case maximum capture for a given investment is to be achieved. An upper limit is imposed on the investment cost; subsequently the problem solver maximizes the cover achieved.

For each flow in the network, an interest value for each flow is defined if additional information about them is available (see section 4.2 below for an example). It is also preferable to collect interfaces with large traffic values in preference over interfaces with little traffic, since this assists in identifying flows with a large volume.

By stating constraints on capacity and investment cost, it can be ensured that a compromise between the cost of the data collection and the flow capture is found.

1.9.2 Use Case 2

In the second use case a lower limit is imposed on the capture rate. The investment required to achieve it is subsequently minimized.

1.9.3 Use Case 3

For the third use case, it can be assumed that existing equipment only is used. The capture rate is then maximized while not exceeding the number of existing concentrators and collectors. If the data collection is implemented by software, the number of collected interfaces does not need to be restricted. For every device, a cost of removing it from its previous location and another cost of placing it at another location is considered.

2 Model

In this section a model of the flow capture problem is presented in the form of a MIP (mixed integer programming) model. This model is exemplary, i.e. it is used to define and clarify the above described constraints and choices and should not be seen as the only possible implementation model.

In any given implementation, only parts of the general model are used, thus allowing significant simplifications of some of the constraints to be made.

2.1 Constants

First, the constants used in the present embodiment are defined:

Definition 2.1:

N is the set of all considered routers in the network. Indices refer to routers.

Definition 2.2:

I is the set of all considered interfaces in the network. Typically, all core interfaces for which data capture can be enabled are considered. The indices i and j refer to interfaces.

Definition 2.3:

F is the set of all considered flows in the network Typically, all PE to PE flows in the network are considered. The model also works for CE to CE flows and for partial flow capture, where the set of interesting flows is a priori restricted to a subset of all possible flows. Indices f refer to flows.

This model can also consider multiple, equal cost paths between two points in the network. Each of these paths is considered as defining a separate flow that needs to be captured.

Definition 2.4:

L is the set of all possible concentrator locations. Indices l refer to locations.

Definition 2.5:

Q is the multi-set of all possible concentrator types. This can be used for example to represent different types of concentrators with varying cost and capability. By using a multi-set, the use of more than one concentrator of the same type in some location is enabled. This gives maximal flexibility in choosing the right concentrator(s) at each location to handle the data volume of the selected interfaces. The value |Q| indicates the maximum number of concentrators that can be used at any given location. Indices q refer to concentrator types.

Definition 2.6:

T is the set of all interface technologies that are used in the network. Typical examples are fast ethernet, serial, OC-12. Limits on how many interfaces of some type are captured in the network may be imposed. Indices t refer to interface technologies. It should be noted that the types are not required to be exclusive; an interface can belong to more than one type.

Definition 2.7:

A is the set of capacity types restricting the concentrator capabilities. These can be values like the collection rate the concentrator can handle, or discrete choices which indicate whether some concentrator type is compatible with some interface type. Indices refer to capacity types.

Definition 2.8:

The 0/1 constants $k_f^i$ indicate whether flow f is routed through interface i and therefore can be captured if data collection for interface i is enabled.

Definition 2.9:

The 0/1 constants $r_i^s$ indicate whether interface i belongs to router s. Typically, each interface belongs to only one router, but the model does not need to enforce this.

Definition 2.10:

The 0/1 constants $u_t^i$ indicate whether interface i uses interface technology t.

Definition 2.11:

The 0/1 constants $v_{ij}$ indicate whether interfaces i and j are linked for data capture purposes. If they are linked, then either both of them are collected or none of them are. Such linked interfaces may exist either because of hardware limitations, which only permit the collection of certain interfaces together or not at all, or it may be a user choice stating for example that if one interface of a router is collected, then all interfaces of this router should be collected.

Definition 2.12:

The 0/1 constants $\bar{w}_{lq}^i$ indicate whether interface i can be collected from location l with a collector of type q. These constants state which choices for the assignment exist; they do not define the assignment itself. That is the task of the variables $w_{lq}^i$.

Definition 2.13:

The non-negative constants $c_i$ indicate the cost of enabling interface i for data capture. The cost may be the administration effort or the investment required to set-up data capture or may be a penalty for an eventual performance loss of the interface in case data capture is enabled.

Definition 2.14:

The non-negative constants $d_l^q$ indicate the cost of a concentrator of the type q at location l. The cost of the same device at different locations may be different due to local procurement or transportation cost from a central location.

Definition 2.15:

The non-negative constants $m_{lq}^i$ indicate the cost of collecting data of interface i from location l with a collector of type q. This cost may be the cost of connecting the concentrator to the specified interface or it may be the cost of transporting the captured data between the interface and the concentrator. In many situations, this cost component can be neglected, if for example router and concentrator are communicating via a local ethernet connection.

Definition 2.16:

The non-negative constants of $p_f$ indicate the interest in collecting flow f by data capture. This forms an important part of the objective function, concentrating the effort on those flows that provide relevant information. A value of 1 for each flow would provide a uniform interest. If the value is (considered to be) proportional to the traffic volume of the flow, the objective functions can be used to identify more large flows. See also 4.2 below.

Definition 2.17:

The non-negative constants $b_i^a$ indicate the collector capacity of type a required for interface i. These values are used to limit either the impact of the data collection on the router or on the concentrators.

Definition 2.18:

The non-negative constants $g_l^{aq}$ indicate the capacity of a concentrator at location l of type q for a capacity limit of type a.

Definition 2.19:

The non-negative constants $h_s^a$ indicate the capacity of a router s for a capacity limit of type a.

Definition 2.20:

The non-negative constants $e_i^t$ indicate the effort of type t that is required when collecting data from interface i.

Definition 2.21:

The non-negative constants $c\_limit_t$ indicate network wide limitations on all enabled interfaces of technology type t. These values can be used for example to limit the number of high-speed interfaces that are collected.

Definition 2.22:

The non-negative constants $traffic_i$ indicate an amount of traffic on interface i. This can be an actually measured traffic counter, or an aggregated traffic value indicative of the relative importance of the interface. These constants are used as part of our objective functions.

Definition 2.23:

The non-negative constants $a_n$ are arbitrary, magic numbers that control the relative importance of the different cost factors in the objective functions. By setting some of these values to zero, it is possible to simplify the model excluding some factors in the optimization.

2.6 Variables

In this section, the variables that are used in the model are described.

Definition 2.24:

The 0/1 integer variables $x_i$ state whether interface i is collected. There are |I| variables of this type in the model.

Definition 2.25:

The 0/1 integer variables $y_l^q$ state whether location l has a concentrator of type q. There are |L|·|Q| variables of this type in the model.

Definition 2.26:

The 0/1 integer variables $z_f$ state whether flow f is collected by the data capture. There are |F| variables of this type in the model.

Definition 2.27:

The 0/1 integer variables $w_{lq}^i$ state whether interface I is collected from location l by a collector of type q. There are at most $|Q| \cdot |L| \cdot |I|$ variables of this type in the model.

The actual number of variables in the model will depend on the degree of flexibility allowed fro a particular problem instance. It is for example unlikely that each interface would be allowed to be collected from every location in the network, so that many $w_{lq}^i$ variables would be pre-set to zero.

Definition 2.28:

The non-negative, continuous variable investment describes the total investment required for the solution.

2.3 Constraints

In this section, the constraints of the model are presented.

Constraints 2.1 (Feasible Assignment):

This constraint states that an interface can only be assigned to a concentrator if this is allowed by the data. Often this assignment is only allowed if the router and the concentrator are placed in the same location $$\forall i \in I, l \in L, q \in Q: w_{lq}^i \leq \tilde{w}_{lq}^i$$

Constraints 2.2 (Linked Variable Constraint):

This constraint handles linked variables. If two variables are linked, then they are either both collected or both uncollected. This means that the corresponding $x_i$ variables must have the same value.

$$\forall i,j \in I : v_{ij} \Rightarrow x_i x_j$$

Constraints 2.3 (Total Investment):

This constraint defines the total investment. It has three components. The first on is based one the cost of selecting an interface for collection, the second is the cost of providing a collector of some type at some location, and the third one is the cost of the assignment of captured interfaces to available concentrators.

$$\text{investment} = \sum_{i \in I} c_i \chi_i + \sum_{\substack{l \in L \\ q \in Q}} d_l^q y_l^q + \sum_{\substack{l \in L \\ i \in I \\ q \in Q}} m_{lq}^i w_{lq}^i$$

Constraint 2.4 (Concentrator Capacity)

This constraint controls the capacity of the concentrators compared to the data collection requirements of the collected interfaces. For each capacity type, the sum of all required capacities of the assigned interfaces must be smaller than the capacity of this type on the concentrator. This constraint can be used for both qualitative and quantitative capacity problems.

$$\forall l \in L, q \in Q, a \in A: \sum_{i \in I} b_i^a w_{lq}^i \leq g_l^{aq} y_l^q$$

Constraint 2.5 (Router Capacity)

This constraint is similar to the concentrator capacity, but handles the capacity of a router to support data collection of selected interfaces. The constraint expresses that for each capacity type the sum of all capacity values required by the collected interfaces must be smaller than the capacity limit given for the router. This can limit the number of interfaces that are collected on a router, and avoids overloading the router with the data collection.

$$\forall s \in N, a \in A: \sum_{\{i \in I | r_s^i\}} b_i^a \chi_i \leq h_s^a$$

Constraint 2.6 (Network-Wide Collector Limit)

This constraint imposes network wide limits on how many interfaces of each technology type can be collected. This can be used to control the impact of flow capture on the overall network performance or impose for example an upper bound on how many fast network probes are required.

$$\forall t \in T: \sum_{\{i \in I | u_i^t\}} e_i^t \chi_i \leq \text{c\_limit}_t$$

Constraint 2.7 (Assigning Interface to Concentrator)

This constraint links the assignment variables and the interface variables. It states that an interface can be assigned to at most one concentrator, and that an interface can only be collected if it is assigned to a concentrator.

$$\forall i \in I: \sum_{\substack{l \in L \\ q \in Q}} w_{lq}^i = \chi_i$$

Constrain 2.8 (No Useless Concentrator)

This constraint states that no concentrator is provided if it is not used to collect at least one interface.

$$\forall l \in L, q \in Q: \sum_{i \in I} w_{lq}^i \geq y_l^q$$

Constraint 2.9 (Concentrator Required)

This constraint ensures that if an interface is assigned to a concentrator, that concentrator must be active.

$$\forall i \in I, l \in L, q \in Q: w_{lq}^i \leq y_l^q$$

Constraint 2.10 (Covering Flows(1))

This constraint states that a flow is covered if any of the interfaces through which it is routed is collected.

$$\forall i \in I, f \in F: k_f^i \Rightarrow z_f \geq x_i$$

Constraint 2.11 (Covering Flows(2))

This constraint states that a flow is only covered if one of the interfaces through which it is routed is collected.

$$\forall f \in F: \sum_{\{i \in I | k_f^i\}} \chi_i \geq z_f$$

2.4 Objective Functions
2.4.1 Use Case 1

Constraint 2.12 (Limited Investment)

For use case 1, an additional constraint is that the total investment is bounded by an upper limit.

$$\text{investment} \leq \text{investment\_limit}$$

Objective Function 2.1 (Maximum Capture)

The objective function states that the weighted sum of two components is maximized. The first is the total interest in collecting flows, the second is a weighted sum of the collected interfaces. While not interesting on its own, the second component can help to identify the large flows in a network, even if there is no good a priori indication which flows are large.

$$\max \alpha_1 \sum_{f \in F} p_f z_f + \alpha_2 \sum_{i \in I} \mathit{traffic}_i x_i$$

2.4.2 Use Case 2

Constraint 2.13 (Guaranteed Capture Level)

In the second use case, a given capture limit is guaranteed, and the sum of the interest in the captured interfaces must exceed some fixed limit.

$$\sum_{f \in F} : p_f z_f \geq \text{capture\_limit}$$

Objective Function 2.2 (Minimize Investment)

The objective function of the second use case is to minimize the total investment required to achieve the given capture limit.

$$\min \text{investment}$$

2.4.3 Use Case 3

For the third use case some more notation is introduced. $\hat{x}$ and $\hat{y}$ are used to denote the existing, deployed solution. For each decision variable, there is a cost to either introduce or remove collection capability. These costs may be different.

Definition 2.29

The 0/1 constants $\hat{x}_i$ denote the existing cover of interfaces.

Definition 2.30

The 0/1 constants $\hat{x}_l^q$ denote the existing set of chosen concentrator locations and types.

Definition 2.31

The non-negative constants $\hat{c}_i$ denote the cost of enabling the data capture for interface i, if interface i was not collected in the previous solution.

Definition 2.32

The non-negative constants $\tilde{c}_i$ denote the cost of disabling the data capture for interface i, if interface i was collected in the previous solution.

Definition 2.33

The non-negative constants $\hat{d}_l^q$ denote the cost of placing a concentrator of type q at location l, when there was no such concentrator in the previous solution.

Definition 2.34

The non-negative constants $\tilde{d}_l^q$ denote the cost of removing a concentrator of type q at location l, when there was such a concentrator in the previous solution.

Definition 2.35

The definition of the restricted difference is recalled to be $$x \dot{-} y = \begin{cases} 0 : y > x \\ x - y : x \geq y \end{cases}$$

Constraints 2.14 (No New Investment)

This is an optional constraint which states that no new collectors are allowed in the network. This could obviously be relaxed to allow some additional investment.

$$\forall q \in Q : \sum_{l \in L} y_l^q \leq \sum_{l \in L} \hat{y}_l^q$$

Constraints 2.15 (Guaranteed Capture Level)

Again some predefined capture leve is enforce for the solution.

$$\sum_{f \in f} p_f z_f \geq \text{capture\_limit}$$

Objective Function 2.3 (Minimize Cost of Changes)

The cost in this third use case is defined by the cost of adding data collection at the newly selected places, and removing it from the no-longer required ones. It is assumed for simplicity that keeping a data collection in some place does not incur any cost.

$$\min \alpha_3 \sum_{i \in I} (\hat{c}_i (x_i \dot{-} \hat{x}_i) + \tilde{c}_i (\hat{x}_i \dot{-} x_i)) +$$

$$\alpha_1 \sum_{\substack{l \in L \\ q \in Q}} (\hat{d}_l^q (y_l^q \dot{-} \hat{y}_l^q) + \tilde{d}_l^q (\hat{y}_l^q \dot{-} y_l^q)) + a_5 \sum_{\substack{i \in I \\ l \in L \\ q \in Q}} m_{l_q}^i w_{l_q}^i$$

3 Solution Method

The model described above, or a simplification of it, that is used for a particular network flow capture problem, can be solved in a variety of ways. Two particular implementation methods are described.

3.1 MIP

The model and the objective functions described above can be directly expressed in mixed integer programming (MIP), a solution method in itself known for combinatorial problems. The model contains the classical set covering and the warehouse location problems, for which specialized IP extensions are available.

3.2 Greedy Algorithm

Another solution method is a greedy algorithm, which tries to build a solution by selecting interfaces that maximize the increase of the capture rate until either the investment limit is reached or the desired capture rate is achieved. In a similar way concentrator locations can be chosen.

4 Possible Extensions

While the model described in this report may already seem quite complex, there are a number of possible extensions which might be considered.

4.1 Combination with TI to Improve Capture Level

Traffic inference (TI) is mentioned above as a possible alternative method for identifying the traffic matrix of a network. But it is also possible to combine TI with the flow capture and combine all available data in a single model. Thereby, more information can be deduced, thus allowing even those flows to be identified that are not directly captured by the data collectors. In order to attempt this, it is necessary to synchronize the data collection activities for the traffic inference model with the flow capture. It is also necessary to provide some form of error correction to handle incompatible measurements.

4.2 Using TI to Identify Good/Bad Flows to Capture

Traffic inference on its own may not be able to identify the exact flow sizes in the traffic matrix, but it is often possible to find at least qualitative information whether a flow is large or not. Such information can be used in the flow capture model as indicators for the interest there is in different flows. This would allow the flow capture to concentrate on the important flows of the network, which often form only a small percentage of all flows that may be considered.

4.3. Temporal Aspects

The flow capture method described herein provides a traffic matrix for a given time point, or more exactly for a time period. One is then faced with the question of how this matrix is related to the network traffic pattern over time. This temporal question can be approached in different ways.

A simple solution consists in measuring the traffic matrix for a long time period, say a day. This provides average numbers for the day. By repeating the process, information about traffic evolution over time can be accumulated.

As an alternative, the traffic matrix can be identified for shorter time periods. Subsequently, averaging is performed on the resulting traffic matrices. To obtain a worst case scenario, the maximal flow value between two points in any of the collected matrices may be considered. Taken together this would give a traffic matrix that gives an upper bound to the network traffic at any time point.

4.4 Capturing Flows Multiple Times

In the described model it is considered necessary to identify a flow just once in order to identify it. However, by placing multiple data collectors on the network, some flows will be automatically collected multiple times. It is then possible to simply pick one of the measurements as the value, or to perform data reconciliation to maximize the likelihood of extracting meaningful data from the network. This is similar to the error correction required in the traffic inference approach, and similar modelling techniques can be applied.

4.4.1 Intentional Multiple Capture

As a further extension it is possible to capture flows not just once, but multiple times so that consistency checking can be performed on the measurement for all (interesting) flows. This again is a simple extension of the model given above.

4.5 Perfect Load Balancing

In the model it is assumed that it is necessary to collect data from an interface through which a flow is routed in order to capture the flow. However, there might be a special situation where a flow can be deduced even if none of the interfaces through which it travels are collected. One such case is perfect load balancing on multiple, equal cost paths. If the traffic between two nodes is routed over several paths which have the same routing cost, and if perfect load balancing between them is assumed, then it is possible to identify the total flow between the nodes by capturing one of these paths and adjusting the total flow sized according to the load balancing split. The model can handle this by associating all interface on all equal cost paths between the nodes with that total flow.

It should be noted that the present invention is not limited to the embodiment described above. It is envisaged that various modifications and variations to the above described embodiment could be made without falling outside the scope of the invention as determined from the claims.

APPENDIX

| Symbol | Explanation |
|---|---|
| A | The set of all capacity types restricting the concentrators |
| F | The set of all flows considered |
| I | The set of all interfaces |
| L | The set of all locations for concentrators |
| N | The set of all routers |
| Q | The multi-set of concentrator types |
| $|Q|$ | The maximum number of concentrators in one location |
| T | The set of all interface technologies |
| a | Index ranging over capacity types |
| $b_i^a$ | collector capacity of type a required for interface i |
| $c_i$ | cost of enabling interface i for collection |
| $c\_limit_t$ | network wide limit on collectors of technology type t |
| $d_l^q$ | cost of concentrator of type q in location l |
| $e_i^t$ | effort of type t collecting interface i |
| f | index ranging over flows |
| $g_l^{aq}$ | collector to type q has this capacity of type a in location l |
| $h_s^a$ | router s has this capacity of type a |
| i | index ranging over interfaces |
| j | index ranging over interfaces |
| $k_f^i$ | flow f is routed through interface I |
| l | index ranging over locations |
| $m_{lq}^i$ | cost of collecting interface i from location l with a concentrator of type g |
| $p_f$ | interest of collecting flow f |
| q | index ranging over concentrator types |
| $r_i^s$ | interface i belongs to router s |
| s | index ranging over routers |
| t | index ranging over interface technologies |
| $traffic_i$ | traffic on interface i |
| $u_t^i$ | interface i uses technology t |
| $v_{ij}$ | interface i and j are linked for collection |
| $\bar{w}_{lq}^i$ | interface i can be collected from location l with concentrator of type q |
| $\alpha_n$ | magic numbers in cost functions |

SYMBOLS

| Symbol | Explanation |
|---|---|
| $w_{lq}^i$ | 0/1 integer variable, interface i is collected from location l with concentrator of type q |
| $x_i$ | 0/1 integer variable, interface i is collected |
| $y_l^q$ | 0/1 integer variable, location l has concentrator of type q |
| $z_f$ | 0/1 integer variable, flow f is covered |
| investment | non-negative variable, the total amount spent on data collection |

The invention claimed is:

1. A method of determining data traffic flow in a network, the method comprising:
 (a) selecting locations within the network for providing data collectors for collecting information about all packets forwarded from an interface of the data collector and processing data pertaining to the network data traffic flow;
 (b) determining the expense and level of data capture that would result from providing the data collectors at the selected locations;
 (c) determining a minimum overall data capture or a maximum overall expense;
 (d) providing the data collectors at the selected locations dependent on the determination in steps (b) and (c); and
 (e) determining a traffic matrix describing traffic flow in the network using data collected and processed by the data collector;
 wherein providing the data collectors at the selected locations comprises providing the data collectors at each of a number of the selected locations to:
minimize an overall expense while meeting the minimum overall data capture; or
maximize an overall data capture while not exceeding the maximum overall expense.

2. The method of claim 1, further comprising:
changing the configuration of the network;
determining the expense or increase or decrease in data capture that would result from re-locating the data collector;
re-locating the data collector dependent on the determination in the previous step and predetermined expense or data capture targets.

3. The method of claim 1, further comprising:
determining a plurality of traffic matrices over a predetermined period of time.

4. The method of claim 3, further comprising:
averaging the plurality of traffic matrices over said predetermined period of time.

5. The method of claim 3, further comprising:
determining the maximum data flow between two points in any of said plurality of traffic matrices to obtain a data flow worst case scenario.

6. The method of claim 1, further comprising:
repeating the traffic matrix determination to obtain data indicative of traffic evolution over time.

7. The method of claim 1, wherein the percentage of the traffic matrix is determined by a percentage of the total data flow volume in the network.

8. The method of claim 1, wherein the percentage of the traffic matrix is determined by a fraction of the number of data flows in the network.

9. The method of claim 1, further comprising:
simulating a routing algorithm used by the network to calculate the data capture of the data collector.

10. The method of claim 1, wherein the expense is determined by an administration overhead in connection with processing data processed by the data collector at a selected location.

11. The method of claim 1, wherein the expense is determined by the cost incurring by providing the data collector at a selected location.

12. The method of claim 1, wherein the expense is determined by the decrease of performance by the network resulting from the provision of the data collector at a selected location.

13. The method of claim 1, wherein said predetermined expense or data capture targets are met by varying the number of the data collectors provided.

14. The method of claim 1, wherein the number of data collectors to be provided is predetermined.

15. The method of claim 1, wherein the data collector extracts data indicative of the network data flow from data processed by a data processing system.

16. The method of claim 1, wherein each of the data collectors is allocated to a data extractor.

17. The method of claim 16, wherein the expense is determined by the cost of traffic between the data collector and the allocated data extractor.

18. The method of claim 1 implemented by mixed integer programming.

19. A data network comprising one or more inputs, outputs and routers, a plurality of data collectors for collecting information about all packets forwarded from an interface of the data collector and processing data pertaining to the data flow in the network, and a processor for determining a traffic matrix describing traffic flow in the network using data processed by the data collector, wherein each of the data collectors is associated with a data capture value and an expense value, dependent on its location within the network, and wherein the number or locations of the data collectors are selected in accordance with predetermined expense or data capture targets, the data capture value and data capture targets are determined by a percentage of the traffic matrix, and the number or locations of the data collectors are selected to minimize an overall expense while meeting a minimum overall data capture, or maximize an overall data capture while not exceeding a maximum overall expense.

20. The data network of claim 19, wherein each of the data collectors is associated with one or more routers.

21. The data network of claim 20, wherein each of the data collectors is associated with one or more interfaces of an associated router.

22. The data network of claim 19, wherein the data collectors extract data indicative of the data flow in the network from the data processed by the data collectors.

23. The data network of claim 22, wherein each of the data collectors is allocated to a data extractor.

24. The data network of claim 19, wherein at least some of the data collectors are connected to one another through a local area network.

25. The data network of claim 19, further comprising a central processor for receiving data from the data collectors and determining the data flow in the network.

26. The data network of claim 25, wherein the central processor is connected to at least some of the data collectors via the data network.

27. The data network of claim 19, wherein at least some of the data collectors are implemented in one or more of the routers.

28. The data network of claim 19, wherein the data collectors are software-implemented.

29. The data network of claim 19, wherein the data collectors are located and adapted to collect data pertinent to the data flow between the routers.

30. The data network of claim 19, wherein the data collectors are located and adapted to collect data pertinent to the data flow between the inputs or the outputs.

31. An apparatus comprising:
a processor for:
(a) selecting locations within the network for providing data collectors for collecting information about all packets forwarded from an interface of the data collector and processing data pertaining to the network data traffic flow;
(b) determining the expense and level of data capture that would result from providing the data collectors at the selected locations;
(c) determining a minimum overall data capture or a maximum overall expense;
(d) providing the data collectors at the selected locations dependent on the determination in steps (b) and (c); and
(e) determining a traffic matrix describing the traffic flow in the network using data collected and processed by the data collector;
memory for storing the traffic matrix;
wherein providing the data collectors at the selected locations comprises providing the data collectors at each of number of the selected locations to:
minimize an overall expense while meeting the minimum overall data capture; or
maximize an overall data capture while not exceeding the maximum overall expense.

32. The apparatus of claim 31 wherein the processor is further configured for:
- changing the configuration of the network;
- determining the expense or increase or decrease in data capture that would result from re-locating the data collector; and
- transmitting instructions to re-locate the data collector dependent on the determination in the previous step and predetermined expense or data capture targets.

33. The apparatus of claim 31, wherein the data collectors are software-implemented.

34. The apparatus of claim 31, wherein the expense is determined by an administration overhead in connection with processing data processed by the data collector at a selected location.

35. The apparatus of claim 31, wherein the expense is determined by the cost incurring by providing the data collectors at selected locations.

36. The apparatus of claim 31, wherein the expense is determined by the decrease of performance by the network resulting from the provision of the data collectors at the selected locations.

37. The apparatus of claim 31, wherein said predetermined expense or data capture are met by varying the number of the data collectors provided.

38. The apparatus of claim 31, wherein the number of data collectors to be provided is predetermined.

* * * * *